April 6, 1943. H. E. MALONE 2,315,533
CONTROL DEVICE
Filed March 2, 1940 2 Sheets-Sheet 1

INVENTOR.
Homer E. Malone
BY
ATTORNEY.

Patented Apr. 6, 1943

2,315,533

UNITED STATES PATENT OFFICE 2,315,533

CONTROL DEVICE

Homer E. Malone, Milwaukee, Wis., assignor to Perfex Corporation, Milwaukee, Wis., a corporation of Wisconsin Application March 2, 1940, Serial No. 321,822

22 Claims. (Cl. 200—138)

This invention relates in general to control devices but more particularly to automatic control devices for use in air conditioning systems, and the broad object of the invention is to provide an improved control device embodying electric switching mechanism operative responsive to temperature changes.

In air conditioning systems it is customary to provide a heating plant or furnace for warming the air in a space to be heated and in some cases to provide a means for circulating the heated air. In order to control the operation of the heating plant within certain limits and to maintain the space at a comfortable temperature a room thermostat is usually provided to regulate the generation of heat from the furnace. To further insure greater uniformity of temperature in the space being heated and to safeguard against excessive temperatures in the heating plant, it has been customary to supplement the room thermostat with a control means commonly called a limit control, which is arranged to respond directly to the temperature of the furnace and may be located upon a warm air duct or the bonnet of the furnace. It is likewise desirable that the heated air be forced or circulated to the space to be heated and for this purpose an additional control device is located so as to be responsive to the furnace temperature to prevent the circulation of the air until it reaches a predetermined temperature. In certain instances it may also be feasible to control the air circulating means in accordance with different speeds at different temperatures to more uniformly regulate the space temperature.

The present invention is concerned with an automatic control device which is arranged to respond to various temperature changes of an air conditioning system, and one of the principal objects is to provide an improved control device for the aforesaid purpose which will function to regulate the air conditioning system in a more reliable and satisfactory manner.

A further object is to provide a control device arranged for use as a combination limit control and air circulating control, or alternatively as a control device for operating the air circulating means at different speeds in response to different temperature values.

It is an additional object to provide a control device having improved cam means for actuating the switching mechanism together with simple means for adjusting the temperature settings and differential operation of the cam means.

Another object is to provide improved switching mechanism in a control device and means whereby positive snap actuation of the switch elements is obtained.

Another object of the invention is to provide an automatic thermostatic control device arranged to be manually operated to actuate the air circulating means in the summer months for the purpose of cooling a room for example.

With the foregoing and other objects in view the invention consists in the construction, arrangement and combination of the various parts and elements of the control device, whereby the objects contemplated are attained, as hereinafter more fully set forth, pointed out in the claims, and illustrated in the accompanying sheets of drawings. A preferred embodiment of the invention is disclosed in the drawings in which:

Fig. 4 is a cross-sectional fragmentary view taken along the line 4—4 of Fig. 2 showing the switch operating cam elements;

Fig. 5 is a perspective view of one of the switching mechanisms;

Fig. 6 is a view showing in extended perspective relationship the various elements mounted on the control operating shaft;

Fig. 7 is a view taken along the line 7—7 of Fig. 1 showing one set of cam discs and also a modified form of the switching mechanism;

Fig. 8 discloses a schematic circuit arrangement showing an adaptation of the control device for controlling the various speeds of an air circulating means; while Fig. 9 is a schematic circuit arrangement showing the use of the control device as a combination limit control and air circulating control means.

Figures 1, 3:
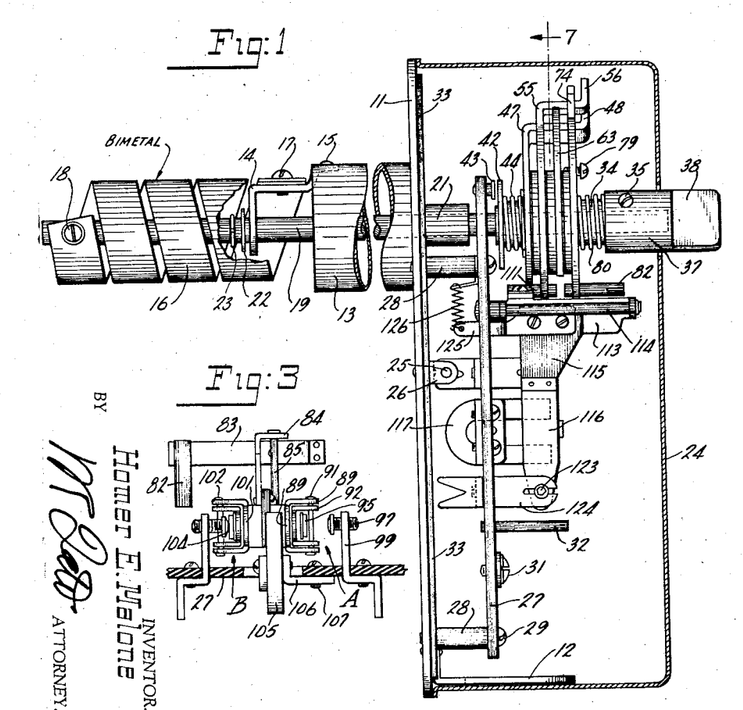
Fig. 1 is a side view, partially in section, of a control device embodying the invention.
Fig. 3 is a view taken along the line 3—3 in Fig. 2 showing the switching mechanism.
Figure 2:
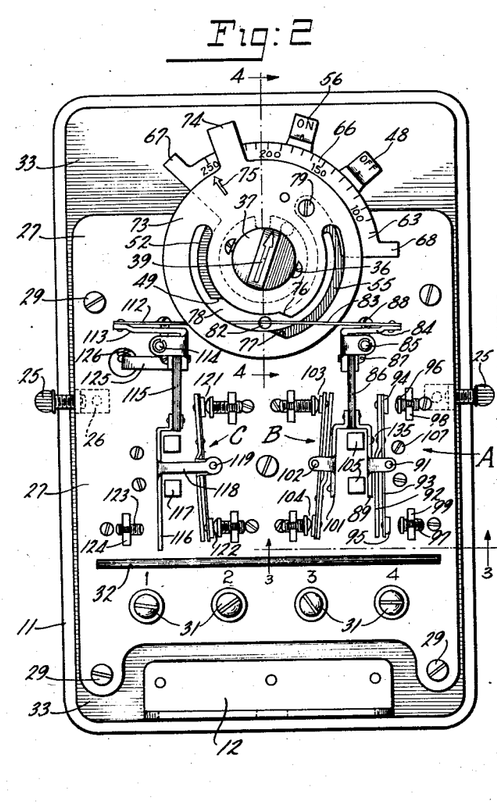
Fig. 2 is a full front view of the control device with the cover or housing removed and showing the control in its operated or running position.

The control device in its essential elements comprises primarily a flat metal base plate 11 having a conduit attaching bracket 12 suitably supported at its lower end as shown in Figs. 1 and 2. Extending rearwardly from the base plate 11 is a metal supporting tube 13 suitably attached as by a staking operation to the base plate 11 as shown in Fig. 4. The tube 13 serves, in the well-known manner, to support, by means of an adjustable flange (not shown), the complete control device in position upon the bonnet or warm air duct of a furnace, or other selected location. The open end of the tube 13 has a bracket element 14 secured thereto as by a rivet 15. The bracket 14 serves as a support and bearing for a physical condition responsive means shown here in the form of a coiled bimetallic helix or thermal element 16. In the use of the device, the bimetal element 16 extends within the warm air duct or furnace so as to be subjected to the varying temperature changes produced within the furnace. The bimetal element 16 is supported and secured at one end by a screw 17 threaded into bracket 14. The other end is fastened by a screw 18 to the end of a rotatable shaft or torsion rod 19 which is arranged to extend axially through the bimetal element 16 and supporting tube 13 to the front side of supporting base 11. A bearing sleeve member 21 suitably secured to supporting plate 11, as shown in Fig. 4, serves to guide the rod 19 and support the same at one end. The bracket 14 performs a similar function intermediate the ends of the rod 19. In order to limit outward or forward axial movement of shaft or rod 19, a stop washer 22 and a cotter 23 on the rod are adapted to contact the bracket 14. The rod 19 is rotatively actuated by the bimetallic helix 16 in conformity with changes in the temperature applied to the bimetallic helix 16. A suitable metal cover or housing 24 is provided for enclosing the control mechanism on the front of the base plate 11 as shown in Fig. 1. This cover 24 is secured in position on the base 11 by means of thumbnuts 25 threaded into L-shaped brackets 26 in turn secured to the base.

Arranged in spaced relationship to the base plate 11 is a panel 27 made of insulated material. This panel 27 is supported by means of a series of spacer studs 28 into which the panel attaching screws 29 are threaded. At the bottom end of the insulating panel 27 there is supported a series of binding posts 31 for the attachment of the connecting wires (not shown) which pass through the opening in conduit bracket 12. In order to segregate the attached wires from the electrical switching equipment arranged above it a barrier plate 32 made of insulating material is suitably staked to the panel 27 in an upright or projecting position. To further electrically insulate the electrical equipment and the wiring arranged under the panel 27, a thin flat wall 33 of insulating material is arranged directly on top or outer face of the supporting base 11.

The operating mechanism for controlling the switching mechanism is supported upon the forward or outer end portion of the torsion rod 19 which extends from the front of the supporting base 11 as shown more clearly in Figs. 4 and 6. One of the elements of this controlling mechanism comprises a tubular sleeve or hub member 34 arranged with an axial bore adapted to fit over the end of the shaft 19. The hub member 34 is rigidly secured to the end of the shaft 19 by means of a pair of screws 35 and 36 threaded into the hub and engaging or tightly abutting a reduced portion of the shaft. A hollow knob or manually controlled member 37 is arranged on the end of the hub member 34 and is provided with a flat finger engaging portion 38 for manually rotating the shaft 19 when desired, as will be pointed out. The end of the finger portion 38 protrudes through the cover 24 and is provided with an indicating arrow 39 at its front surface which indicates in cooperation with suitable indicia 40 on the cover front, the rotated position of shaft 19 and therefore the temperature of the bimetal 16 at any particular time.

Secured as by riveting to the other end of hub member 34 is a flat disc 41 having a notch 42 cut in its periphery. The notch 42 is adapted to engage a lug or pin 43 which is rigidly mounted on the panel 27. The engagement of the notch 42 with the pin 43 is brought about when the shaft 19 is manually rotated and pushed inward by the knob 37 as will be pointed out hereinafter.

Referring particularly now to Fig. 6 a plurality of elements are arranged in sequential order as shown upon the outside of hub member 34. The first of these elements comprises a stiff compression spring 44 encircling the portion 45 of the hub 34. A flat metal bearing washer 46 is then placed upon the portion 45 after which the "off" cam member or disc 47 is placed on the hub. The "off" cam 47 is provided with an integral extension or adjusting arm 48 having suitable indicia stamped thereon as shown. An operating cam surface 49 is formed on the periphery of the cam member 47. Extending from one side of the cam surface 49 a low retaining surface 51 is formed on the cam periphery, while extending from the other side of cam surface 49 a high retaining surface 52 is provided. A thin paper washer 53 and a fiber or cork washer 54 are next arranged on the hub. These two elements together comprise a frictional resistance means which tends to frictionally restrain rotary movement of the "off" cam member 47 on the shaft 45 against the compression of spring 44 when a manual adjustment of the cam member is being made.

The next element in order mounted upon the hub 34 is the "on" cam member or disc 55 having an integral adjusting arm 56 extending therefrom which is supplied with suitable indicia as shown. The cam member 55 is provided with a circulator slot 57 having a cam surface 58 formed on the side of the slot and an inner retaining surface 59 and an outer retaining surface 60 extending from opposite sides of cam surface 58. The next elements placed upon the shaft comprise a paper washer 61 and a fiber washer 62 which together provide frictional resistance to the rotary adjustment of cam member 55 against the pressure spring 44.

A scale member or indicating disc comprising a flat segment member 63 is next placed upon the hub member 34. Instead of being loose and freely rotatively positioned upon the hub member, as are the other aforesaid elements, the scale member 63 is rigidly and firmly secured to the hub member 34 by means of the cooperating knurled surfaces 64 and 65 on the hub 34 and the scale 63, enabling the scale plate 63 to be forced onto the hub with a drive fit. The scale member 63 is provided at its periphery with graduated markings 66 comprising suitable temperature indications which cooperate with the markings on the adjusting arms 48 and 56 to indicate the adjusted settings of the cam members 47 and 55. At one end of the scale 66 an integral stop member 67 is provided and a similar stop member 68 is arranged at the other end of the scale. These stops limit the adjusting range of the adjusting arms 48 and 56. A slot 69 is cut in the scale member 63 for a purpose which will be hereinafter pointed out.

Following the foregoing elements in the assembly on the hub member 34, a third set of friction means comprising a paper washer 71 and a fiber washer 72 are next placed on the hub member 34 together with a single cam member or disc 73 which is loosely positioned upon the hub 34. The cam member 73 is provided with a projection 74 for adjustably manipulating the position of the cam member upon the hub against the friction of friction washers 71 and 72. The cam member 73 is also provided with an indicating arrow 75 to indicate its adjusted position or setting with respect to the temperature markings 66 on the scale plate 63. Cam member 73 is additionally provided with cam surfaces 76 and 77 oppositely disposed from each other and formed on the opposite sides of a single circular slot 78 cut in the cam. Inner and outer retaining surfaces form the side walls of slot 78 and extend from each side of the cam surfaces 76 and 77. A stop screw 79 is arranged to be threaded into either one of two or more screw holes in the cam disc 73 and extends through the rear of the cam member to cooperate with the end of the slot 69 in the scale plate 63 to adjustably limit the adjustment of cam member 73 beyond a certain range.

A compression spring 80 is next placed upon the hub member 34 and exerts its effort against the side of cam member 73 to yieldingly urge it toward the front side of the scale member 63 in the same manner that compression spring 44 yieldingly urges or presses both of the cam members 47 and 55 toward the rear side of scale member 63. After all of the foregoing elements have been positioned in the successive order upon the hub 34, as shown in the assembled relationship in Fig. 4, the knob member 37 is placed over the end of the hub 34 to engage the end of the rotatable shaft 19 so that the complete assembled unit is securely and rigidly attached to the end of the operating shaft 19.

The various cam surfaces 49, 56, 76 and 77 are arranged to operate and effect the various control or switching operations for which the control device has been designed. To perform this function in the desired manner a cam follower or roller member 82 is arranged to protrude through the slot 78 from the front side of the cam member 73 and is adapted to be engaged by the cam surface 76 to move the cam follower 82 in one direction and by the cam surface 77 to move the cam follower in the opposite direction when the cam member is rotated. Cam follower 82 is rigidly secured to the end of a flexible member or spring leaf 83, the other end of which spring is rigidly fastened to an irregular shaped bracket or pivoted lever 84 as may be more clearly seen in Fig. 5. Bracket lever 84 is pivoted for swinging movement from the front of insulating panel 27 upon a pivot pin 85 and an insulating arm 86 is rigidly secured as by screws 87 to the pivoted bracket 84. In order to properly calibrate the position of the cam follower 82 within the circular slot 78 through which it extends, an adjusting screw 88 is threaded into lever 84, and by turning this screw 88 in any direction the proper amount, the cam follower 82 may be centered in the slot.

The movable or lower end of insulating arm 86 is arranged to carry or support one of the control means or switching equipment of the device. This switching equipment designated generally as A includes a flat magnetic armature member 89 rigidly secured as shown to the end of the insulating member 86. A pair of turned up ear portions of armature 89 form a support for a pivot pin 91 upon which a rigid non-magnetic bridging bar or member 92 is pivotally supported as shown clearly in Fig. 3. A flexible arm 93 is suitably riveted as shown to one end of the rigid bridging bar 92. A pair of control means shown as movable contact elements 94 and 95 are arranged upon opposite ends of the rigid bar 92 and flexible arm 93. The movable contact 95 is secured to the end of flexible arm 93 in spaced relationship to the adjacent end of rigid bar 92 while the movable contact 94 is clamped rigidly with the flexible arm 93 to the other end of the rigid bar 92. A pair of control elements shown as fixed contact points or studs 96 and 97 are adjustably supported in turned-up brackets 98 and 99 which are in turn secured to and supported as by the screws shown, upon the insulating panel 27. The fixed contact points 96 and 97 are arranged in cooperable relationship with the movable contact points 94 and 95, respectively.

Also secured to the lower end of the insulating arm 86 and spaced opposite the armature 89 is a similar armature 101. Armature 101 supports a pivot pin 102 which in turn pivotally carries a control means or switching mechanism designated as B which is similar to that carried by armature 89 and which includes the pairs of control elements or contact sets 103 and 104. Arranged between the two armatures 89 and 101 and with its poles projecting through the panel 27 and in cooperative magnetic relationship with the armatures, is a permanent magnet 105. As seen in Fig. 3, magnet 105 is held in position by a bracket 106 and a suitable clamping screw which are in turn supported from the underside of insulating panel 27 by supporting screw 107 threaded into the bracket.

With the foregoing arrangement of elements it is seen that upon clockwise rotation of the cam member 73 toward the position assumed in Fig. 2, the cam surface 76 just strikes the cam follower 82 thereby rotating bracket 84 counterclockwise about pivot pin 85 causing the movement of the lower end of insulating arm 86 in a right-hand direction. The armature 89 is thereby moved to a position outside of the magnetic influence of magnet 105 while the armature 101 is moved within the magnetic field and adjacent the poles of the magnet. This results in closing the set of movable contacts 94 and 95 with the fixed contacts 96 and 97 respectively and opening the contact sets 103 and 104. The switching mechanisms A and B are thereby controlled solely by the rotation of cam member 73 in either direction.

The opening and closing movements of the contact sets is performed with snap action in order to minimize destructive arcing between the contact sets and to prevent erratic circuit operation, thereby insuring reliable and positive performance. This operation is initiated by the bimetal element 16 being subjected to temperature changes so as to rotate the shaft 19 and the various cam members. The cam follower 82 is thereby engaged by cam surface 76, for example, and a certain amount of tension is gradually stored in the bimetallic element 16 as it engages the cam follower 82. This tension of bimetal element 16 gradually increases against the magnetic pull of the magnet 105 upon the armature 89 until a balance of force between the bimetal element and the magnet is reached after which the bimetal element assumes full control due to the sudden release of its stored energy and the magnet loses its influence over the armature 89. The armature 101, however, has now moved within the magnetic influence of the magnet and as it approaches the magnet pole pieces the rate of movement increases. As a result of the foregoing, contact sets 103—104 are opened and the contact sets 94—96 and 95—97 are closed with a quick snap action movement. The resiliency of the flexible member 83 assists somewhat in producing the snap action. The actual contact separation of the contact sets 103—104 however, does not take place until a short interval after the aforesaid balance of force between the magnet and bimetal element has been passed and the mechanism is moving very quickly. This is due to the flexure of the flexible arm maintaining the contacts closed as the rigid bar moves away from the rear of the spaced movable contact. As the contact sets 94—96 and 95—97 engage, the rigid bar 92 engages the rear side of contact 95 and the rigid bar acts as a stop to limit the movement of the armature 101 against the magnet and to hold the contacts firmly in engagement so that they are not affected by vibration or other disturbances. The flexible arm 93 being slightly bowed at this time a wiping action takes place as the contacts engage and again when they open. This also tends to eliminate any "bouncing" of the contacts as they engage. Since the rigid bar 92 is pivoted at 91 at its center point a leveling or equalizing action of the contact pressure upon both sets of contacts is provided for. For the same reason, should either set of contacts stick or weld slightly the other set would open to interrupt the circuit and a prying action would take place about the pivot to force the sticking contacts apart. It is clear that by the use of the bridging bar 82 the use of "pig tail" or other loose connections for the movable portion of the switching mechanism is eliminated. The movement of the switching mechanisms A and B in the reverse direction is accomplished in the same manner.

A second switching mechanism designated generally as "C" is arranged and controlled jointly by the rotation of the two cam members 47 and 55. As seen clearly in Fig. 7 a cam follower 111 projects through the circular slot 57 in cam member 55 from the rear side thereof and in operative relation to the periphery of the cam member 47. The cam follower 111 is adapted to be moved in one direction by the cam surface 58 when the cam member 55 is rotated clockwise, and moved by the cam surface 49 in the opposite direction then the cam member 47 is rotated counter-clockwise. A relatively flexible arm 112 is arranged to support the cam follower 111 at one of its ends while at the other end the bar 112 is rigidly secured to the bracket 113 which is in turn pivoted upon a pin 114 projecting from the panel 27. The bracket 113 is arranged to carry an insulating operating arm 115. A single magnetic armature 116 (Fig. 2) is carried on the lower end of the insulating arm 115 and is arranged to be moved into and out of the magnetic influence of the permanent magnet 117 which is supported upon the panel 47 in a manner similar to the mounting of magnet 105. A pair of extending ears 118 projecting from armature 116 between the magnet poles to the other side of the magnet are arranged to carry a pivot pin 119 at their ends. Pivot pin 119 pivotally carries a switching mechanism C arranged in a similar manner to the switching equipment A and B previously described. The switching equipment C is adapted to open and close a set of contact points 121 and 122 with snap action. The closure of the contacts limits the movement of the armature 116 towards the poles of the magnet 117 in one direction while when the armature is moved in the opposite direction it strikes an adjustable stop 123 carried upon a bracket 124 supported on the insulating panel 127. The magnet 117 is adapted to hold the contacts in closed position after having once been actuated in that position and in order to maintain them in the open position away from the influence of the magnet, since a second armature is not provided, an additional holding means is provided comprising an arm 125 attached to the pivoted bracket 113 and having its end extending through an opening in the panel 127 to the rear thereof and a tension spring 126 attached at one end to the arm 125 and the other end to the supporting stud 28. The spring 126 is effective to snap and hold the armature 116 against the stop 123. From the foregoing arrangement it is seen that the contact switching mechanism C is adapted to be moved into contact closing position with snap action by the magnet 117 responsive to the movement of cam follower 111 by cam surface 58 in one direction, and into contact opening position with snap action by the spring 126 responsive to the cam surface 49 moving the cam follower 111 in the opposite direction.

A modification of the foregoing switching mechanism is illustrated in Fig. 7 which shows a switching mechanism D and E of a construction somewhat similar to the mechanism A and B of Fig. 2. In the switching mechanism A and B it will be remembered, both armatures 89 and 101 are constructed of magnetic material so that they are adapted to be influenced by the magnet 105 when moved within its magnetic influence, in order to actuate the contacts with snap action. In the switching mechanism C the armature 116 is effective to close the contact sets in one direction with snap action while the spring 126 performs the same function in the opposite direction. In the modification shown the switching mechanism D has its contact structure mounted on a member 127 which is made of nonmagnetic material so that magnet 117 will have no magnetic control on the member 127. The other switch structure E, however, is mounted on an armature 128 made of magnetic material. With this arrangement when the bracket lever 113 is pivoted in a clockwise direction, the member 128 is moved toward the magnet 117 while magnetic armature 128 is moved out of the influence of the magnet. Since member 127 is non-magnetic the magnet cannot hold it in the position in which it has been moved. To hold the member 127 and its associated switch mechanism in its operated position the tension spring 126 is provided which is attached to the spring arm 125. As a result the cooperating contact sets 131 and 132 are snapped and maintained open while the contact sets 133 and 134 are snapped and held firmly in their closed position by the tension exerted by the spring 126. When the bracket lever 113 is rotated in a counter clockwise direction the insulating arm 115 swings to the right to place the armature 128 within the influence of magnet 117 and against the tension exerted by spring 126. As a result contact sets 131 and 132 are closed and held tightly in that position by the pull of magnet 117 upon armature 128 while at the same time contact sets 133 and 134 are open.

In order to prevent too great a pivotal movement of the contacts sets about their associated pivots such as 91 and 102 which might inadvertently produce a possible short circuit between two sets of contacts mechanisms such as A and B or D and E, slight projections such as 135 are provided upon the armatures to limit the free pivoting movement of the rigid arms 92.

In the normal usage of the control device, the cam members may be set to establish their control function in accordance with various temperature adjustments. For example, as illustrated in the drawings, the cam member 73 is ordinarily adjusted so that the arrow 75 is positioned opposite a temperature indication of 250 degrees on the scale plate 66. In adjusting the arm 74 it is convenient to grasp the finger piece 39 with one hand to hold the shaft 19 steady while moving the adjusting arm 74 with the other hand to rotate the cam member 73. The adjusting arm 56 of the "on" cam member 55 is then adjusted in the same manner to a position usually at 175 degrees on the scale 66. The "off" cam adjusting arm is adjusted and set to indicate a temperature of usually 125 degrees. From the foregoing it is seen that each of the adjusting arms 48, 56 and 74, are preferably arranged in sequential order across the scale plate 66, thereby positioning the associated cam surfaces 49, 58 and 76—77 in definite sequence so that the switching mechanisms C, B and A are properly operated in sequence and in accordance with the temperature settings of the associated indicating arms.

Referring particularly to Fig. 1 it will be noted that the adjusting arms 48, 56 and 74 are so formed and arranged as to preclude the possibility of the adjusting arms overlapping each other and thereby cause incorrect operation of the switching mechanism, thus insuring a definite sequence of switching operations. The stop members 67 and 68 on the scale member 63 prevent the adjustment of the adjusting arms 56 and 48 above or below a particular temperature range. The screw 79 in cam member 73 is adapted to engage one end of slot 69 cut in the scale member 63 and limits the movement of this cam member above a particular temperature range. In the event that the bimetal 16 should be subjected to excessive heat or cold beyond that at which the control device is arranged to normally operate, the stops 67 and 68 would be rotated until they engaged either the pivot pin 85 or 114. This halts the rotation of the elements and prevents the disarrangement of the adjusting arms which would otherwise take place by the ends of the circular slots 57 and 58 engaging the cam followers 82 and 111 respectively, and rotating the cam members against the friction washers. It will be observed that the arrow 39 on the finger piece 38 cooperate with the temperature scale 40 (Fig. 6) stamped upon the front of cover 24 to at all times indicate the correct temperature of the medium surrounding the bimetal element 16.

The control device as illustrated in the drawings is arranged to show a partial operated position in that the bimetal element 16 is under the influence of a temperature value of about 200 degrees as indicated by the arrow 39 and the cover scale 40. Therefore, the switching mechanisms A, B and C have been shown actuated in a particular sequential manner.

Referring now to Fig. 8, there is disclosed a schematic circuit arrangement depicting one of the uses for the control device as a part of a heating system. In this arrangement a two-speed fan motor is shown wired so that the switching mechanism C controls the off and on circuit of the fan motor, while the switching mechanism B controls the low speed operation of the fan, and the switching mechanism A the high speed operation of the fan. This is desirable in heating systems where the speed of the fan may be controlled in response to various temperature values of the system, rather than have the fan cut in at a constant speed for a wide temperature range.

In the clockwise movement of the cam members to the position shown in Fig. 2, due to the heating and consequent operation of the bimetal, the cam surface 58 first engages cam follower 111 to close the contact sets 121 and 122 of switching mechanism C. This occurs when a temperature value of 175 degrees is encountered, as indicated by the setting of the adjusting arm 56. A circuit is thereby completed extending from the "hot" side of the line through the contact sets 121—122 of the switching mechanism C, contacts 103—104 of the switching mechanism B, through the low speed winding of the fan motor to the "grd" or ground side of the line. At the temperature of 175 degrees, therefore, the fan is operated at low speed to force the heated air throughout the premises being heated by the system. As the temperature gradually increases, a temperature point of 250 degrees is eventually encountered as indicated by the arrow 75 for the adjusting arm 74. At this temperature point the cam surface 76 engages cam follower 82, and as a result the switching mechanism B snaps open the contacts 103—104 and the switching mechanism A closes contacts 94—96 and 95—97. This results in the transfer of the circuit from the low speed winding of the fan motor over to the high speed portion, and the increased speed of the fan is enabled to circulate the higher heated air more rapidly. The bimetal element may continue to be heated beyond 250 degrees and the fan consequently operates at its high speed.

It will be understood, of course, that the circuit arrangement described is incorporated in a heating system involving other instrumentalities, such as suitable burners, room thermostat, etc. When the room thermostat has been satisfied and cut off the heat from the furnace, the temperature at which bimetal 16 is subjected to gradually recedes and the bimetal begins to restore and rotate the cam members in a counter-clockwise direction. Eventually a temperature point of 250 degrees or less is reached depending upon the fixed differential between the cam surfaces 76 and 77. The cam surface 77 thereby engages cam follower 82, with the result that the switching mechanism A snaps open its contacts and mechanism B closes its contacts again so that the fan is now operated at the lower temperature value. This low speed of the fan continues for a time until the temperature recedes to a value of 125 degrees, as indicated by the adjustment of the "off" cam adjusting arm 48. When this point is encountered cam surface 49 engages cam follower 111 to snap open the contact sets 121—122 of the switching mechanism C. As a result the operation of the fan motor is stopped. The bimetal element 16 continues to gradually cool off as the heat in the furnace is dissipated, until it reaches the temperature of the ambient air, or slightly higher, depending upon the residual heat existing in the furnace to which the control device is attached. The control device is now in its normal inactive position of rest.

It will be noted that the cam member 73 has its cam surfaces 76—77 formed on opposite sides of the circular slot 78. With this arrangement the cam follower 82 is always actuated in one direction by the cam surface 76 at the particular temperature value indicated by the arrow 75 on the scale plate 66 and in the other direction by the cam surface 77 at a temperature value of a few degrees lower for example. Therefore a fixed operating differential for the cam follower 82 is provided. The slot edges extending from each side of the cam surfaces permits the continual rotation of the cam member 73 in either direction without straining the switching mechanism, since the cam follower rides along in the slot 78. A form of "lost motion" connection is thereby provided for the elements. The switching mechanism C, however, in which the cam follower 111 is controlled by the two cam surfaces 49 and 58, is arranged with an adjustable differential. The cam surface 58 actuates the switching mechanism C at one temperature, while the cam surface 49 actuates the switching mechanism C at another or lower temperature point, and moving the adjusting arms 48 and 56 closer together on the scale plate narrows the differential, while moving them apart widens the differential or operating point between the cut-in and the cut-out point at which the switching mechanism is operated.

It may be desirable during the summer months, for example, when the heating plant is shut down, to operate the fan motor to circulate cool air throughout the premises. To accomplish this, the finger piece 38 of the knob 37 is grasped and manually rotated clockwise against the tension exerted by bimetal 16 until a position is reached in which the notch 42 (see Fig. 7) registers with or is in alignment with the pin 43 on the panel 27. At this point the knob 37 is then pushed slightly inward until the pin and notch engage, whereupon the knob is released. The energy stored in the bimetal 16 is sufficient to hold the edge of notch 42 in engagement with the head of pin 43 and the cam elements are thereby locked in position until manually released. In the locked position the switching mechanism C has its contacts locked closed, switching mechanism B open, and switching mechanism A closed. The fan motor is thereby continually operated at a high speed to circulate the cooling air throughout the premises.

Under certain conditions the burner may be arranged to start operation with the control locked in manual operative position in which event the bimetal 16 would be heated up until an elevated temperature point is encountered, for example 250 degrees, and which is also the position at which the notch 42 is opposite pin 43. When this occurs the manual locked setting is released and the control is restored automatically to its automatic operation.

In the circuit arrangement of Fig. 8 it will be noted the contacts 103 and 96 are strapped together. With the wiring arranged in this manner the possibility of a short circuit occurring through the armature between adjacent sets of contact sets A and B is avoided.

Referring now particularly to Fig. 9, this shows a schematic circuit diagram involving a fan motor and a burner, and a room thermostat T has also been indicated. In this arrangement the fan motor is controlled by the switching mechanism C while the burner is controlled by the switching mechanism B connected in parallel with the fan motor and switching mechanism C. In the operation of this arrangement the switching mechanism B functions as a high limit control to disconnect the burner when a temperature of 250 degrees, as indicated by the setting of the cam member 73, is encountered. The fan motor is cut into operation when a temperature of 175 degrees is encountered and cut out again when a temperature of 125 degrees is reached. The thermostat T is operative to start the burner upon a call for heat so that the bimetal element 16 will be subjected to the rise in temperature to operate the control device in its proper sequence, as has been pointed out.

In certain localities to prevent overheating of the furnace it is required that the switching mechanism B be so arranged that it cannot be adjusted to operate above a particular high temperature value. For this purpose the stop screw 79 is arranged in one of the screw holes in cam member 73 so as to engage the end of slot 69 in scale member 63 and prevent the adjustment of adjusting arm 74 to a temperature point beyond the range of 250 degrees for example.

If it is desired to operate the fan motor in the summer months for cooling purposes, the knob 37 may be manually rotated to lock the cam elements in position as has been pointed out. In this position the switching mechanism C is locked with its contacts closed to run the fan motor, and the thermostat T must be adjusted to maintain its contacts closed. The switching mechanism B is locked open and prevents the operation of the burner under these conditions.

From the foregoing description it will be appreciated that a novel control mechanism has been devised which is extremely simple in operation; in which the switching mechanisms are reliably operated in sequential order without possibility of overlapping the control points; in which adjustments are readily made; and in which several sets of switching mechanisms may be operated through the function of a single bimetal element.

While only one preferred embodiment of the invention with two alternative switch mechanisms have been illustrated and described, it will be apparent that any number of modifications or deviations from the exact structure described may be made by those skilled in the art, and it is to be understood that the invention is not limited to the particular disclosure, but only by the extent of the scope of the appended claims.

What is claimed is:

1. In a control device, a hub member, means for effecting rotational movement of said hub member in either of two directions, an indicating scale member rigidly secured to the hub member and rotatable therewith, a pair of adjustable cam members arranged on the hub member on one side of the scale member, a single cam member arranged on the hub member on the other side of the scale member, means on the hub member yieldingly urging all of said cam members toward said scale member so as to be rotatable therewith, friction means on the hub member between the cam members and the scale member whereby rotational adjustment of the cam members with respect to the scale member is afforded, separate control means arranged to be operated by the rotation of said pair of cam members and by said single cam member, and cooperating indicating means on all of said cam members and said scale member for indicating the adjusted position of the cam members and therefore the point at which the associated control means is operated.

2. In a control device, a hub, means for effecting rotational movement of said hub in either direction, at least three cam members frictionally mounted on said hub for rotational adjustment relative to said hub and relative to each other and normally held by said frictional mounting for rotation with said hub, a pair of independently actuable control elements one operatively associated with a first one of said cam members for actuation thereby and the other operatively associated with the second and third ones of said cam members for actuation in one direction by said second cam member and in the other direction by said third cam member.

3. In a control device, a hub member, physical condition responsive means for rotating said hub member in either of two directions, a switch operating member, a first and a second cam member arranged on said hub member, means on the first cam member for actuating the switch member in one direction upon the rotation of the hub member in one direction, means on the second cam member for actuating the switch member in another direction upon rotation of the hub member in the opposite direction, an indicating disc rigidly secured to the hub member, yieldable means on said hub member for holding said cam members against one side of said indicating disc so as to be normally movable therewith, friction means on said hub member between the cam members and indicating disc whereby adjustment of the cam members on the hub member is afforded to vary the operating point at which the switch member is actuated by the cam members, a third cam member arranged on the hub member, a second switch operating member, means on the third cam member for actuating the second switch member in either of two directions upon rotation of the hub member, a second yieldable means on the hub member for holding said third cam against the other side of the indicating disc so as normally to be movable therewith, and friction means between the third cam member and the indicating disc whereby adjustment of the third cam member on the hub member is afforded.

4. In a control device, a hub member, means for effecting rotational movement of said hub member in either of two directions, a scale member rigidly secured to said hub member so as to be rotatable therewith, a pair of cooperating cam members on the hub member arranged on one side of the scale member, a single cam member on the hub member arranged on the other side of the scale member, means for yieldably urging all of said cam members against said scale member so as to be rotatable therewith, means frictionally engaging said cam members and said scale member, an adjusting arm on each cam member for variably adjusting the associated cam member against said friction means, cooperating adjustment indicating means on the scale member and said adjusting arms, and separate control means operated by said pair of cam members and said single cam member.

5. In a control device, a hub member, means for effecting rotational movement of said hub member in either of two directions, a scale member rigidly secured to said hub member and rotatable therewith, a pair of cam members on the hub member arranged on one side of the scale member, a single cam member on the hub member arranged on the opposite side of the scale member, means on the hub member for frictionally holding all of said cam members against said scale member so as to be rotatable therewith, adjusting means on each of said cam members for adjusting the position of the associated cam member against the friction holding means, a first control means actuated by the rotation of said single cam member, said single cam member provided with a fixed control operating differential, a second control means actuated by the rotation of said pair of cam members, said pair of cam members cooperating to provide a variable control operating differential, and stop means on said scale member for limiting the range of adjustment of said adjusting means.

6. In a control device, a hub member, temperature responsive means for rotating said hub member in either of two directions, a scale member rigidly secured to the hub member and rotatable therewith, cam members on the hub member arranged on opposite sides of the scale member, means on the hub member for frictionally holding said cam members against said scale member so as to be rotatable therewith, an adjusting arm on each cam member for adjusting the position of the cam member against the friction holding means, stop means on the scale member for limiting the range of adjustment of one of the adjusting arms, said cam members having a circular slot formed therein with a cam surface on the sides of the slot, a cam follower in the slot of each cam member arranged to be actuated by the cam surface upon the rotation of the associated cam member, control means connected to the cam followers and actuated by the movement thereof, and other stop means engageable by the scale member for limiting the rotation of the hub member beyond a fixed range whereby the ends of the cam slots are prevented from engaging the cam followers and disturbing the adjusted setting of the adjusting arms in the event that the effort of the temperature responsive means is abnormally excessive.

7. In a control device, a rotatable hub member, adjustable cam means carried upon the hub member and rotatable therewith, switch control means operated by the cam means, physical condition responsive means connected to said hub member for rotating the same to effect the actuation of said switch control means, manual means on the hub member to effect the actuation of said switch control means independently of the operation of the physical condition responsive means, and means for locking said switch control means in the actuated position only when actuated by the manual means.

8. In a control device, a rotatable hub member, a cam member adjustably supported on said hub member, switch control means, means on said cam member for operating the switch control means upon the hub member being rotated an adjustable predetermined distance, a resilient temperature responsive element connected to one end of the hub member for effecting rotation of the hub member and thereby the actuation of the switch control means, a knob member on the other end of the hub member for manually rotating the hub member in opposition to the resiliency of the temperature responsive element to also actuate the switch control means, and means for locking the switch control means in actuated position after the knob member is manually actuated, the resiliency of said temperature responsive element maintaining said locking means effective.

9. In a control device, a rotatable hub member, a cam member adjustably carried on said hub member, switch control means, said switch control means actuated by the cam member upon the rotation of the hub member to a predetermined position, resilient temperature responsive means connected to said hub member for effecting rotation of said hub member within a normal operating range including said predetermined position, a knob member connected to said hub member for manually rotating the hub member beyond the operating range in opposition to the resiliency of the temperature responsive element to operate the switch control means independently of the temperature responsive means, locking means controlled by the knob member for locking the hub member and thereby the switch control means in operated position, the resiliency of the temperature responsive means cooperating with said locking means to hold the switch control means in locked position, and said temperature responsive means acting when heated beyond said range to automatically release said locking means.

10. In a control device, a hub member, temperature responsive means for effecting rotational movement of said hub member in either of two directions, a scale member rigidly secured to the hub member and rotatable therewith, a plurality of cam members on the hub member arranged on opposite sides of the scale member, means on the hub member for frictionally holding all of said cam members against said scale member so as to be rotatable therewith, an adjusting arm on each cam member for adjusting the position of the associated cam member against the friction holding means, stop means on the scale member for limiting the range of adjustment of said adjusting arms, a separate control means actuated by each of said cam members at a point dependent upon the adjusted position of the associated cam member, manually operated means on the hub member for rotating the hub member independently of the temperature response means and for locking the hub member in its rotated position whereby the control means are locked in a selected operated position, said manually operated means locking said hub member in position at a point beyond the normal operating range at which it is actuated by the temperature responsive means.

11. In a control device, a physical condition responsive means having inherent resiliency, an adjustable cam member arranged to be operated by said physical condition responsive means, a cam follower, said cam member having a slot therein through which said cam follower extends whereby said cam follower is operated in either of two directions as the cam member is operated, pivoted switching mechanism, and lever means connecting the cam follower with the switching mechanism for operating the same, said switching mechanism comprising; a pair of armatures connected to the lever means and a magnet arranged between the two armatures, pairs of movable contacts, means for pivotally supporting a pair of movable contacts from each armature, a pair of fixed contacts arranged in operable relation to the movable contacts, the resiliency of said physical condition responsive means cooperating with said armatures and magnet to effect the operation of said contacts with snap action.

12. In a control device, a temperature responsive element having inherent resiliency, an adjustable cam member arranged to be rotated in either of two directions by said temperature responsive means, a cam follower arranged to be operated by said cam member, and switching mechanism controlled by the operation of said cam follower, said switching mechanism comprising; a pivoted lever connected to said cam follower, a magnet, separate armatures arranged on opposite sides of said magnet and connected to said pivoted lever, a pair of movable contacts for each armature, pairs of fixed contacts arranged in operable relationship with the pairs of movable contacts, a bridging means for supporting the movable contacts in spaced relationship, means for pivotally supporting each bridging means from the associated armature, whereby equal contact pressure is applied to the contacts of each pair in their closed positions, said contacts being operated with snap action produced by the conjoint action of said magnet and armature and the resiliency of said temperature responsive means.

13. In a control device, switching mechanism, an actuator member for said switching mechanism, said switching mechanism comprising a pair of armatures secured to said actuator member and movable thereby, a magnet arranged between the pair of armatures and effective to exert a magnetic snap action and holding force upon either armature when moved into close proximity thereto, separate bridging bars one for each armature, each bridging bar being pivoted at its center to the corresponding armature and having limited pivotal movement, pairs of spaced movable contacts carried by said bridging bars and pairs of fixed contacts arranged in operative relation with corresponding pairs of movable contacts, the pivotal arrangement of said bridging bars providing equal contact pressure upon the closed pairs of contacts when the associated armature is under the influence of the magnet, and the fixed contacts acting as stops to prevent actual engagement of the armature with the magnet.

14. In a switching mechanism, a pivoted lever, means for operating said lever in either of two directions, two armatures arranged in spaced parallel relationship and secured at one of their ends to the pivoted lever so as to be actuated thereby, a magnet disposed between the two armatures and arranged to attract with snap action and hold either armature when moved into the influence of the magnet by the pivoted lever, the other armature at the same time being moved away from the magnet, separate bridging bars freely pivoted at their mid-points to the sides of the armatures away from the magnet, pairs of movable contacts carried on the ends of the bridging bars, corresponding pairs of fixed contacts arranged in cooperative relationship with the pairs of movable contacts, each bridging bar effective to establish a closed circuit series path including corresponding pairs of fixed and movable contacts and the bridging bar when the said pairs of contacts are closed responsive to the attraction of the armature associated with the other pairs of contacts, the pivoted bridging bars providing for equal pressure upon the pairs of closed contacts, and the fixed contacts serving as stops to limit the attraction of the armatures towards the magnet.

15. In a control device, a physical condition responsive means, a pivoted operating lever, a cam member controlled by said physical condition responsive means for actuating said operating lever in either of two directions about its pivot, and switching mechanism operated by said pivoted lever, said switching mechanism comprising; an armature and a non-magnetic member arranged in spaced parallel relationship and attached to the pivoted lever, a magnet disposed between the armature and the non-magnetic member and arranged to magnetically snap and hold the armature adjacent the magnet when moved into its influence by the pivoted lever, a spring for snapping and holding the non-magnetic member toward the magnet while at the same time the armature is snapped away from the magnet, separate contact bridging bars one freely pivoted to the armature and another freely pivoted to the non-magnetic member, pairs of movable contacts carried by the bridging bars, pairs of fixed contacts supported in operative relation with corresponding pairs of movable contacts, said contacts arranged so that the closure of a pair of contacts establishes a series circuit path through the movable and fixed contacts and the associated bridging bar, the pivoting arrangement of the bridging bars providing for equal contact pressure upon either closed pair of contacts when the armature is snapped within the holding influence of the magnet or the spring has snapped the non-magnetic member towards the magnet.

16. In a control device, a rotatable base member, an indicia structure mounted upon said base member and arranged to rotate therewith, a first cam means arranged on said base member on one side of said indicia structure, a second cam means arranged on said base member on the other side of said indicia structure, adjusting means associated with said first cam means for adjusting the angular position of said first cam means on said base member, means shifted with said first came means and cooperating with said indicia structure for indicating the setting of the first cam means on said base member, adjusting means associated with said second cam means for adjusting its angular position on said base member, means shifted with said second cam means and cooperating with said indicia structure for indicating the setting of said second cam means, and control means actuated by said first and second cam means.

17. In a control device, a rotatable base member, an indicia structure mounted upon said base member and arranged to rotate therewith, a first cam means arranged on said base member on one side of said indicia structure, a second cam means arranged on said base member on the other side of said indicia structure, spring and friction means for yieldably urging said first and second cam means into frictional engagement with said indicia structure so as normally to rotate therewith, a manual adjusting handle associated with said first cam means for adjusting the angular position of said first cam means on said base member, means shifted with said first cam means and cooperating with said indicia structure for indicating the setting of the first cam means on said base member, a manual adjusting handle associated with the second cam means for adjusting its angular position on said base member, means shifted with said second cam means and cooperating with said indicia structure for indicating the setting of said second cam means, and control means actuated by said first and second cam means.

18. In a control instrument for a heater, a resilient temperature responsive means adapted to respond to the temperature of the heater, a controller adapted to control the temperature of the heater, motion transmitting means between said temperature responsive means and said controller for causing movement of said controller in accordance with changes in temperature at said temperature responsive means, a manual control member for manually operating said controller to a predetermined position in opposition to the resiliency of said temperature responsive means without changing the normal temperature setting of the instrument, locking means controlled by the manual control member for locking the controller in said predetermined position, the resiliency of the temperature responsive means cooperating with the locking means to hold the controller in said predetermined position, and said temperature responsive means acting when heated beyond a predetermined value to release said locking means.

19. In a control device, switching mechanism, an actuator member for said switching mechanism, said switching mechanism comprising a pair of armatures secured to said actuator member and movable thereby, magnet means associated with said armatures and effective to exert a magnetic snap action and holding force on either armature when moved into close proximity thereto, separate bridging bars one for each armature, each bridging bar being pivoted at its center to the corresponding armature and having limited pivotal movement, pairs of spaced movable contacts carried by said bridging bars and pairs of fixed contacts arranged in cooperative relationship with corresponding pairs of said movable contacts, the pivotal arrangement of said bridging bars providing equal contact pressure upon the closed pairs of contacts when the associated armature is under the influence of the magnet means, and the fixed contacts acting as stops to prevent the actual engagement of the armatures with the magnet means.

20. In a control device, switching mechanism, an actuator member for said switching mechanism, said switching mechanism comprising armature means secured to said actuator member and movable thereby, magnet means associated with said armature means and arranged to exert an increasing magnetic pull on said armature means upon movement thereof in one direction to impart snap action to said movement, said magnet means also arranged to exert an increasing magnetic pull on said armature means in the opposite direction upon movement thereof in said opposite direction, a first bridging bar pivotally secured intermediate its ends at one side of said armature means and carrying a pair of spaced contacts, a pair of fixed contacts in cooperative relationship with said pair of movable contacts, a second bridging bar pivotally secured intermediate its ends at the other side of said armature means, a pair of fixed contacts in cooperative relationship with the last mentioned pair of movable contacts, the pivotal arrangement of said bridging bars providing equal contact pressure upon the closed pairs of contacts and the fixed contacts acting as stops to prevent actual engagement of the armature means with the magnet means.

21. In a control device, a rotatable member, control means actuated from one position to another by rotation of said member, resilient condition responsive means for rotating said rotatable member, manual means for rotating said rotatable member independently of and against the resiliency of said condition responsive means to cause said control means to assume a predetermined one of its positions irrespective of the value of the condition to which the condition responsive means responds, and means for retaining the control means in such predetermined position after the manual means is released.

22. In a control device, a rotatable member, control means actuated from one position to another by rotation of said member, resilient condition responsive means for rotating said rotatable member, manual means for rotating said rotatable member independently of and against the resiliency of said condition responsive means to cause said control means to assume a predetermined one of its positions irrespective of the value of the condition to which the condition responsive means responds, and means for retaining the control means in such predetermined position after the manual means is released, said retaining means including a stationary latch member and a movable latch member arranged to be held in engagement by the resiliency of the condition responsive means.

HOMER E. MALONE.

CERTIFICATE OF CORRECTION.

Patent No. 2,315,533.　　　　　　　　　　　April 6, 1943.

HOMER E. MALONE.

It is hereby certified that error appears in the printed specification of the above numbered patent requiring correction as follows: Page 8, first column, line 8, claim 9, for "element" read --means--; and that the said Letters Patent should be read with this correction therein that the same may conform to the record of the case in the Patent Office.

Signed and sealed this 9th day of November, A. D. 1943.

Henry Van Arsdale,
Acting Commissioner of Patents.

(Seal)